(12) United States Patent
Chiu et al.

(10) Patent No.: US 7,003,737 B2
(45) Date of Patent: Feb. 21, 2006

(54) METHOD FOR INTERACTIVE BROWSING AND VISUALIZATION OF DOCUMENTS IN REAL SPACE AND TIME

(75) Inventors: Patrick Chiu, Menlo Park, CA (US); Khai Truong, Atlanta, GA (US)

(73) Assignee: Fuji Xerox Co., Ltd., Tokyo (JP)

( * ) Notice: Subject to any disclaimer, the term of this patent is extended or adjusted under 35 U.S.C. 154(b) by 547 days.

(21) Appl. No.: 10/126,555

(22) Filed: Apr. 19, 2002

(65) Prior Publication Data
US 2003/0197731 A1    Oct. 23, 2003

(51) Int. Cl.
*G06F 3/00*    (2006.01)

(52) U.S. Cl. .................. 715/848; 715/850; 345/679

(58) Field of Classification Search ................ 715/764, 715/848, 679, 850; 345/427
See application file for complete search history.

(56) References Cited

U.S. PATENT DOCUMENTS

| | | | | |
|---|---|---|---|---|
| 5,555,354 | A | * | 9/1996 | Strasnick et al. ........... 345/427 |
| 5,621,906 | A | * | 4/1997 | O'Neill et al. .............. 715/848 |
| 6,054,989 | A | * | 4/2000 | Robertson et al. .......... 715/848 |
| 6,222,547 | B1 | * | 4/2001 | Schwuttke et al. ......... 345/419 |
| 6,462,736 | B1 | * | 10/2002 | Ross et al. .................. 345/419 |
| 6,480,210 | B1 | * | 11/2002 | Martino et al. ............. 715/848 |
| 6,647,534 | B1 | * | 11/2003 | Graham ....................... 715/526 |
| 6,768,497 | B1 | * | 7/2004 | Baar et al. .................. 345/661 |

OTHER PUBLICATIONS

George Robertson, Stuart K Card, Jack D. Mackinlay, "Information Visualization using 3D Interactive Animation", Apr. 1993, Communications of the AC, vol. 36, No. 4, pp 57-71.*

International Conference, of Human-Computer Interaction, L.E. Holmquist, C. Ahlberg, "Flip Zooming: A practical focus +context approach to visualising large data sets", 1997, ELSEVIER, vol. 2, pp 763-766.*

Computer Graphics Lab, Swiss Federal Institute of Technology,Serge Rezzonico, Daniel Thalmann, "Browsing 3D Bookmarks in Bed", Aug. 4, 1998, pp1-6.*

ACM Symposium on user interface software and technology, Bjork et al. "West: A web browser for small terminals" Nov. 1999, Association for computing machinery, CHI letters, V1, No. 1, pp 187-196.*

Chi, et al., "Visualizing the Evolution of Web Ecologies," *CHI*, 1998, Apr. 18-23, 1998, pp. 400-407.

(Continued)

*Primary Examiner*—Ba Huynh
*Assistant Examiner*—Steven Theriault
(74) *Attorney, Agent, or Firm*—Fliesler Meyer LLP

(57) ABSTRACT

A system and method for displaying, browsing and accessing content in real space and time. In one embodiment, a user may browse and access multiple types of electronic content in a three dimensional representation of real space and time, where each document has a time and space attribute. A user may also place electronic documents at different locations in real space and time. A user performs inquiries by moving a space indicator along a time line. A visual indicator representing a relevancy score may provide information regarding document proximity to a selected location in space and time. The relevance score may also offset uncertainties inherent in location tracking systems. A document window is provided to display documents located at a selected point in space and time. Visual indicators associated with the documents may represent the time and space location of each document. Documents in the document window may be sorted as desired by a user.

20 Claims, 5 Drawing Sheets

OTHER PUBLICATIONS

Freeman, et al., "Lifestreams: A Storage Model for Personal Data" pp. 1-7.

Hochheiser, et al., "Visual Specification of Queries for Finding Patterns in Time-Series Data," pp. 1-27.

Rekimoto, "Time-Machine Computing: A Time-centric Approach for the Information Environment," *CHI*, vol. 1, pp. 45-54.

* cited by examiner

METHOD FOR INTERACTIVE BROWSING AND VISUALIZATION OF DOCUMENTS IN REAL SPACE AND TIME

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of document management, and more particularly to the field of document management in space and time.

BACKGROUND OF THE INVENTION

Effective management and organization of electronic documents is important In environments where multiple types of documents are created at different times and reside at different locations, keeping track of these documents is difficult. As documents are created, modified, and transferred among multiple users and locations, it becomes important to provide a user with the capability to browse and access document in different points in space and time.

Several attempts have been made to organize documents based on time. *Timefinder*, by Hochleiser and Shneiderman, University of Maryland, College Park, Md., uses timeboxes to pose queries over a set of entities with one or more time varying attributes. Entities have one or more static attributes, and one or more time-varying attributes, with the number of time points and the definition of those points being the same for every entity in a given data set. If there are multiple time-varying attributes, any one of them can be selected for querying, through a drop-down menu which specifies the dynamic attribute being queried. All active queries refer to the same attribute.

Once a data set is loaded, entities in the data set are displayed in a window in the upper left hand corner of the application. Each entity is labeled with its name and is plotted on a graph. Additional details regarding the entity can be displayed in an upper right hand window by selecting the entity. A user may specify a query by drawing a timebox in a desired location in a bottom left window. Once a query is completed, the upper windows will display information related to the users query. Thus, a user may get time based information on an entity at a particular time by making a query regarding that entity.

*Time Tube*, by Chi et al, Xerox Palo Alto Research Center, Palo Alto, Calif., discloses a method for visualizing the World Wide Web. Disk trees represent a discrete time slice of the web ecology. A disk tree uses a circular layout to visualize a hierarchy, where successive layers of circles represent levels in a tree. Treelinks, page access frequency and page lifecycle stages are represented by different colors or lines. A collection of disk trees forms a Time Tube. The Time Tube represents the evolution of web sites by displaying, along a time line, a series of disk trees that represent the hyperlink structure of a particular site.

*Lifestreams*, by Freeman and Gelernter, Yale University, New Haven, Conn., is a way organizing documents created by one user. All documents created by a user using the interface become part of a time ordered one dimensional stream of documents. The stream of documents may be displayed as several overlapping documents having different time attributes. Color is used to indicate an aspect of a particular document, such as whether or not it the document has been read. Substreams of documents can also be created as the result of a search for documents with a certain characteristic, such as format or content.

*Time Machine Computing*, by Jun Rekimoto, Sony Computer Science Laboratories, Inc, Tokyo, Japan, provides as system that stores the state and content of a desktop. A user may then go back and forth between different times and different corresponding desktops. While at a archived desktop state, the user may double-click on documents and applications that appear on the particular desktop snapshot. A time line view allows desktop items to be viewed as horizontal lines representing time. The beginning of line indicates a creation date, and an end of a line indicates a deletion date.

The systems of the prior art have several disadvantages. One of the disadvantages is that none of these previous systems provide a way for browsing and accessing a document at different points in real space and time. What is needed is a system that overcomes the disadvantages of the prior art.

SUMMARY OF THE INVENTION

The present invention provides a system and method for displaying, browsing and accessing content in space and time. In one embodiment, a space time browser allows a user to browse and access multiple types of electronic content in a three dimensional grid representing real space and time, where each document has a time and space attribute. A user may also place electronic documents at different locations in real space and time. A user may interact with the browser by moving a space indicator along a time line to perform inquiries. In one embodiment, a visual indicator representing a relevancy score is used to provide information regarding documents close to but not located exactly at a selected location in space and time. In one embodiment, in the case of mobile documents, a relevance score is also used to offset uncertainties inherent in location tracking systems.

In one embodiment of the present invention, a document window is provided to display documents located at a selected point in space and time. Visual indicators associated with the documents may represent the time and space location of each document. Documents in the document window may be sorted by document type or as desired by a user.

DETAILED DESCRIPTION

Figure 1:
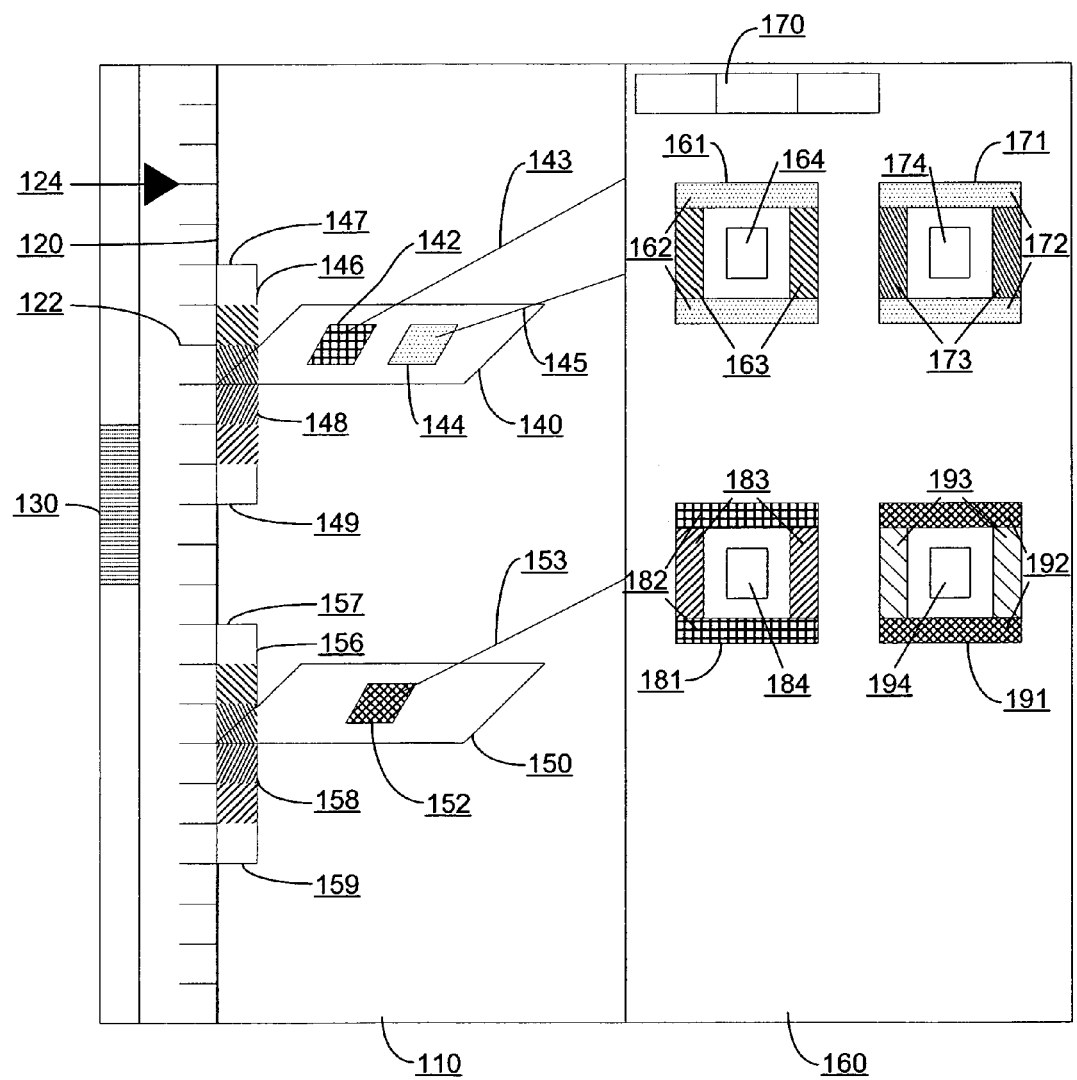
FIG. 1 is a diagram of a space time browser interface in accordance with one embodiment of the present invention.

The present invention provides a system for browsing and accessing multiple types of electronic content in real space and time. In one embodiment, a user may interact with a space time browser by moving a space indicator along a time line to perform inquiries. Each document in the browser has a time and space attribute. When the space indicator is located at a point in time that matches the space and time attributes document, the document is highlighted and a user may access the document. In one embodiment, a visual indicator representing a relevancy score is used to provide information regarding the proximity of a document to a selected space and time. The relevancy score may also be used to offset uncertainties inherent in location tracking systems. In one embodiment of the present invention, a document window is provided to display documents located at a selected point in space and time. Visual indicators associated with the documents in the document window may represent the time and space location of each document.

A space time browser in accordance with one embodiment of the present invention includes a content location window and a document window. The content location window displays the location of content in space and time. The document window allows a user to view the content in more detail.

The content location window may include a time indicator and a space indicator. In one embodiment of the present invention, the time indicator includes a time line. In this embodiment, the time line and space indicator may comprise a three dimensional grid. In one implementation of the grid, space may be represented in a two dimensional manner and time may be represented linearly. In one embodiment, time may be represented by a vertical or z axis and space may be represented by a horizontal plane on the x and y axis. The z axis depicting time may be shown in units of minutes, hours, days, weeks, months, or some other unit of time. In one embodiment, the units to depict time may be chosen by a user. A current time indicator may be provided that indicates the current time on the time axis. The current time indicator may appear as either a digital clock or analog clock, a highlighted cross hair or some other indicator located on the time axis, or as some other visual representation of the time. In one embodiment, the current time indicator is represented as a pointer or arrow pointing to the current time on a time axis.

The space indicator within the content location window may include a space plane. In one embodiment, the space plane is a visual representation of a particular location or area. The location may be an office floor plan, a geographical map, a country, or some other depiction of an area. In another embodiment, the location may be an abstract area. An abstract version of the space plane may include shapes that represent an area such as a meeting room to be determined in the future, locations located too far from each other to be represented to scale, or other locations. In yet another embodiment, the location may be a combination of abstract and non-abstract areas. In one embodiment, the space plane is associated with a time period within the time indicator. A document having a time attribute falling within this time period will be considered to match the time location of the space plane. The time period may be a short period of time such as a minute or a second or a longer period of time measured in hours or days, as configured by a user.

In one embodiment, multiple space planes may be displayed at the same time. The space planes may represent different locations such as a first and second floor of an office building. The space planes may also represent the same location at different times. In one embodiment, multiple locations can be displayed at the same location in time. In this case, the locations at the same time could either be shown along the same time line or along separate time lines.

In one embodiment, each space plane may include one or more location indicators. A location indicator represents the location where an electronic document, text file, video file, or other electronic file (hereinafter referred to collectively as "documents") was created, modified or stored, will be modified, referred to in a meeting, or where some other action was or will be taken pertinent to the document. Examples of location indicators include a room, a city, a building, a computer, or some other location. A location indicator can also represent an abstract location. In one embodiment, each location indicator may be associated with a visual indicator. A visual indicator may have an on or off state representing whether or not a document is located within a particular location indicator at a particular time location of the space plane. Location indicators may have visual indicators that are similar or unique to other visual indicators on the same space plane. In one embodiment, a visual indicator for a location indicator includes a color highlight. In this case, a location indicator may be colored yellow, blue, or some other color or combination of colors. The one state of the visual indicator is the color itself and the off state is a gray, black, or some background color of the space plane. In one embodiment, different location indicators may have similar visual indicators. The similar visual indicators may represent a relationship between the location indicators having the same visual indicator. In another embodiment, all location indicators may have a unique visual indicator to distinguish themselves from each other. In addition to colors, visual indicators may include a pattern, icon, or some other visible indication.

The configuring of space and time information for a digital document may be achieved in several ways. In one embodiment, a data repository is used to store information regarding each document. The data base repository could be a database, a flat file system or a distributed file system. Each document is "tagged" with its space and time location information or attribute. The time tag or attribute may specify when the document was created, modified, due for review or updating, when it is to be used in the future, or some other date as desired by the user. The space tag or attribute may identify the location the document is stored or where the action regarding the document (such as a modification, meeting reminder) occurs. In one embodiment, the tag identifies a unique location indicator. For example, tag information may specify a particular room number or room name. The corresponding space plane can then be derived from the location indicator tag.

In another embodiment, the document may be mobile. In this case, the location associated with a document will change over time. For example, the document may be located on a lap top computer, a personal digital assistant (PDA), a cell phone, a digital camera, or some other transportable storage medium. As the storage medium moves, the document will move. In this case, the location of the document may be determined by tracking the location of the medium on which the document is stored. For example, a wireless networked tracking system could be used to track a laptop computer in an office floor plan. In one embodiment, the tracking system would be operable to determine the position of the document storage medium precisely enough to determine what office the storage medium is in. For outdoor areas, other positioning systems could be used such as the Global Positioning System (GPS). In the case of mobile documents, a tracking system may determine the position of the document and transmit location information to the database. The location information can be stored in several ways. In one embodiment, the location information can be saved as part of a document. For example, an application may store the location information in part of the file, invisible to the user. In another example, a document may store its location information at a certain point within the document, such as the first or last line or in a header. In yet another embodiment, the location information can be stored externally to the document. In one example, the location information could be stored as a meta-data file with location information, time information and a pointer to the document itself. In another embodiment, the document may be transmitted to a different location over a network. In this case, the time and space attributes would be written to the data repository by the application or in some other manner.

Location tracking systems may contain a degree of uncertainty in the location data they provide. Various techniques may be incorporated to compensate for these uncertainties. In one embodiment, a relevance score may be employed to handle location tracking system uncertainties as well as factor in data such as proximity in space and time. In one embodiment, a relevance score may be determined as follows. A point in space and time may be defined as u=(s, t). In the case of planar space, s=(x, y) is a point on a horizontal plane, so u=(s, t)=(x, y, t). A second point may be defined as v=(x', y', t'). The distance d(u, v) between points u and v may be assumed to be a Euclidean distance. Accordingly, the uncertainty or probability of being at a point u in space-time by:

$$p(u) \in [0,1].$$

In one embodiment, this p(u) may be furnished by a location sensing system as discussed above. Next, the relevance of one point u with respect to another point v in space-time can be defined as:

$$r(u,v) = \{(p(u)+p(v))/2\}\{1/(1+d^\alpha(u,v)).$$

In one embodiment, $\alpha$ may be 1 or 2. In this embodiment, r(u, u)=p(u) and points farther apart in space-time are less relevant to each other.

For a document a, we denote the confidence of a with respect to a point u in space and time by $$c_u(a) \in [0,1].$$

In one embodiment, $c_u(a)$ may come from the confidence score of an automatic index algorithm if a is an index into a multimedia stream. If a is a simple document, $c_u(a)=1$.

Finally, we define the relevance score of a document a with respect to a point u in space and time by:

$$r_u(a) = p(u)c_u(a).$$

In one embodiment, the relevance score is for prescribing the level of fading in the visualization.

In one embodiment, the space plane includes one or more time interval bars. The time interval bars represent a period of time surrounding the time location of the space plane. When a document residing in a particular location indicator falls within the time period of the time interval bars, the documents location indicator is highlighted on the space plane. In an embodiment having a three dimensional representation of space and time, the time interval bars extend from the space plane along the time axis. In one embodiment, there is a future time interval bar and a past time interval bar. The time interval bars may have visual indicators to distinguish between each other. In one example, the future time interval bar may be one color such as red and the past time interval bar may another color such as blue. In another embodiment, the time interval bars associated with a single space plane may be more than one color, different shapes, or have some other visually distinguishing characteristic. One such visual characteristic may be fading effect. In one embodiment, fading of a time interval bar may be proportional to the relevance score and proximity to the space plane. Thus, as a time interval bar extends away from the space plane, the fading would increase. For example, the future time interval bar may be solid red near the space plane, pink in the middle, and fade to complete transparency at the end of the interval. In one embodiment, a user may configure the period of time a time interval bar extends from the space plane.

A user may browse content located in real space in time by moving a space plane along a time axis. In one embodiment, when a space plane is located at a time position where a relevant action has or will occur regarding a document located in the space plane, the location indicator where the relevant action occurred is highlighted by a visual indicator. The visual indicator may include coloring, a pattern, an icon, or some other visible indicator. Once highlighted, a user may provide a first input to browse a particular location indicator. In one embodiment, browsing a highlighted location indicator allows a user to receive information about the location. The information may include the name of the location, a contact person to call regarding the information, a telephone and fax number related to the location, and other information. A user may provide a second input to select a particular location indicator. In one embodiment, when a user selects a highlighted location, all documents in that location in space and time may appear in the document window. In one embodiment, there is a visual indicator that indicates that documents from the selected location are shown in the document window. This visual indicator may include a line segment from the selected location to the edge of the document window. In one embodiment, multiple locations may be chosen simultaneously.

The document window is used to display documents. In one embodiment, the document window displays documents associated with a selected location indicator in the space plane. Documents from multiple selected location indicators may be displayed simultaneously. Documents may be displayed as file icons, file lists, text documents, index frames when the document is a video file, or in other formats. The documents displayed in the document window may include a document border. In one embodiment, documents may be added to a location indicator by dragging the document over the desired location indicator when the space plane is located at the desired time. In another embodiment, a user may drag a document into the document window when the desired location indicator is selected. In another embodiment, a document may be configured with time and location information and the user may drag the document into the workspace regardless of any currently selected location indicator. In this case, the document will automatically be associated with the location in time and space as time and location information it is configured with. In yet another embodiment, the document is added to a location in space and time by adding document information, including space and time location information, to a database.

In one embodiment, visual indicators associated with each document displayed in the document window may provide information regarding the location of each file. A first visual indicator for a document may provide information regarding where the document is located in space. The first visual indicator may include the border of a document displayed in the document window. In an embodiment, a portion of the border of a document may be colored or patterned the same color or pattern as the location indicator the document is located in. For example, a location indicator may have a color green. Once the green location indicator is selected by a user, documents located in the selected location indicator may appear in the document window with at least part of the border of each document colored green. In one embodiment, the top and bottom of the document border may be colored or patterned according to the location indicator the document is located in.

A second visual indicator for a document may provide information regarding where the document is located in time. In one embodiment, the visual indicator may indicate the document appears at the same time location as the space plane that contains the document. In another embodiment, the visual indicator may indicate the document appears at a time different then the time of the space plane but within a time interval bar associated with the space plane. In this case, a portion of the border of a document may have the same color or pattern as the time interval bar color or pattern. In one embodiment, the left and right border of a document frame will have the same color or pattern as the color or pattern at the point in time of the time interval bar the document is located in. In another embodiment, the portion of the border having the same color or pattern as the time interval bar may also be faded or transparent. In this embodiment, the degree of the fading or transparency of the document border will correspond to the fading or transparency of the time interval bar at the particular time location of the document. In yet another embodiment, the document icon, key frame, or other representation will be faded according to the fading of the time interval bar.

A space time browser 100 in accordance with one embodiment of the present invention is shown in FIG. 1. Space time browser 100 includes a content location window 110 and document window 160. Space time window 110 includes a time line 120, a current time indicator 124, space planes 140 and 150, time browsing bar 130, location indicators 142, 144 and 152, time interval bars 146, 148, 156 and 158, time interval bar ends 147, 149, 157 and 159, selection lines 143, 145, and 153. Document window 160 includes a menu bar 170 and document files 161, 171, 181 and 191. Document file 161 includes borders 162 and 163 and icon 164, document file 171 includes borders 172 and 173 and icon 174, document file 181 includes borders 182 and 183 and icon 184 and document file 191 includes borders 192 and 193 and icon 194.

A space plane may move along time line 120. In one embodiment, a user may provide a first input to select a space plane and then provide a second input to choose what time to display the space plane at. In one embodiment, the first input includes using a mouse to position a cursor over the space plane and pressing a mouse button. The second input includes dragging the cursor along the time line while depressing the mouse button. A user may also browse along time line 130. In one embodiment, a user provides input indicating an earlier or later time should be displayed. In one embodiment, browsing the time line includes using a mouse to position a cursor over the time browsing bar 130 and pressing a mouse button. While depressing the mouse button, the user may drag the time browsing bar along time line 120 to view future or past periods of time. In another embodiment, the space plane is integrated with time browsing bar 130. In this embodiment, selecting and dragging the time browsing bar along time line 120 moves a space plane to different points in time along the time line. As the space plane is moved to different points in time, a particular location indicator may become highlighted or visually distinguished if a document is located at or near the particular point in time and within the space indicator.

In the embodiment shown in FIG. 1, location indicators 142, 144 and 152 each include a different visual indicator. In particular, each location indicator in FIG. 1 is filled with a different pattern. Document files 161, 171, 181 and 191 each include a visual indicator in a portion of their border to correspond to the location indicator each document is located in. In the embodiment shown in FIG. 1, the top and bottom portion of the document file borders correspond to the location indicators they are located in. Thus, border portion 162 of document file 161 and border portion 172 of document file 171 correspond to the pattern of location indicator 144. Similarly, border pattern 182 of document file 181 corresponds to location indicator 142, and border pattern 192 of document file 191 corresponds to location indicator 152.

In the embodiment shown in FIG. 1, a user may browse or select a location indicator to ascertain what documents are located at that point in space and time. In the embodiment shown, documents corresponding to a selected location indicator will be shown in document window 160 if they are located within the space of the location indicator and time of the time interval bars. When a particular location indicator is selected, a selection line will be generated that extends from the location indicator to document window 160. In the embodiment shown in FIG. 1, selection line 143 indicates location indicator 142 is selected, selection line 145 indicates location indicator 144 is selected, and selection line 153 indicates location indicator 152 is selected.

In the embodiment shown in FIG. 1, time interval bars 146, 148, 156, and 158 include visual indicators. As shown in FIG. 1, the visual indicators change as the time interval bars extend away from their particular space plane. In particular, each time interval bar in FIG. 1 includes a pattern of lines, wherein the space between lines increases as the time interval bars extend away from the space plane. Document files 161, 171, 181 and 191 each include a visual indicator in a portion of their border to correspond to the position in the time interval bars they are located in. In the embodiment shown in FIG. 1, the left and right sides of the document file border correspond to the position in the time interval bar the document is located in. For example, the pattern on the left and right portion of the border of document 161 matches the pattern in interval time bar 146 at a point within the time interval bar closer to space plane 140. Accordingly, document 161 has an approximate time location within the time interval bar 146 closer to space plane 140. The pattern on the left and right portion of the border of document 171 is solid. On the embodiment shown in FIG. 3, a solid pattern indicates that document 171 is located at the same time location as space plane 140. The pattern on the left and right portion of the border of document 181 corresponds to time interval bar 148. The pattern on the left and right portion of the border of document 191 corresponds to the time interval bar of 158. In document 191, the pattern in the border matches the pattern approximately located at a point in the time interval bar located further away from space plane 150, and closer to time interval bar end 159.

As shown in FIG. 1, icons or other representations of each document may be displayed within the border of each document representation. In the embodiment displayed in FIG. 1, document icons 164, 174, 184 and 194 are displayed. The document icons may include a visual indicator representing where the documents are located. In one embodiment where the time interval bars fade as they extend away from the space plane, the icons are faded according to the point in the time interval bars the document is located in time. For example, icon 174 has less fading then icon 164. In the embodiment shown in FIG. 1, this indicates that the document corresponding to icon 174 is closer to space plane 140 then the document corresponding to icon 164.

In the embodiment shown in FIG. 1, menu bar 170 may include one or more tabs or other indications for configuring the document window. In one embodiment, the tabs configure the display of documents in the document window. For example, the tabs may specify the type of document to display, such as text, video, or some other type of document. The tabs may also specify the format to display the documents in, such as a workspace, a list, or some other format. In another embodiment, a user may create tabs to organize the documents and display window as the user desires.

Figure 2:
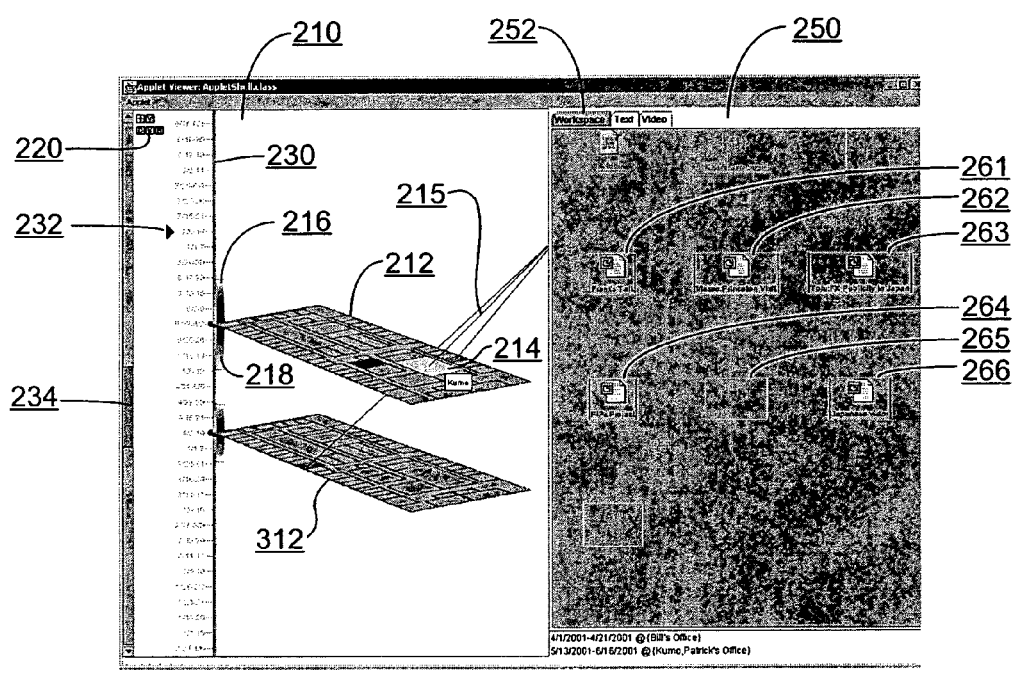
FIG. 2 is a diagram of a space time browser interface displaying a workspace in accordance with one embodiment of the present invention.

The present invention will now explained in the form of several examples as displayed in FIGS. 2–5, each example representing a different embodiment of the present invention. A space time browser 200 in accordance with one embodiment of the present invention is shown in FIG. 2. Space browser 200 includes content location window 210, document window 250, space planes 212 and 312, location indicator 214, selection line 215, time interval bars 216 and 218, time line display area 220, time line 230, current time indicator 232, time browsing bar 234, document selection bar 252, and documents 261–166. Space planes 212 and 312 show the same floor plan at different times. The time interval bars 216 and 218 fade as they extend away from space plane 212. In document window 250, the document selection bar 252 includes tabs for selecting a workspace, text, or video based documents. The workspace tab is currently selected. Thus, the documents may be viewed and managed in the document window as on a typical workspace. The horizontal top and bottom portion of the borders of documents 261–266 are the same shade as location indicator 214. The vertical side borders of documents 261–266 correspond to different time locations in the time interval bars 216 and 218. In the embodiment shown, each document icon is faded according to the fading of the time interval bar at the point in time the document is located. The increased fading of document 265 indicates it is located at a point in a time interval bar further away from space plane 212. The slight fading of document 266 indicates it is located at a point in the time interval bar closer to space plane 212. Time line display area 220 may be used to configure the detail of time line 230. In the embodiment shown, time line display area 220 includes buttons allowing a user to show increments in time line 230 of days, weeks, or months. In one embodiment, when a document icon in the document window is selected, the space time browser will execute the application that created the document so the document can be accessed by the user.

Figure 3:
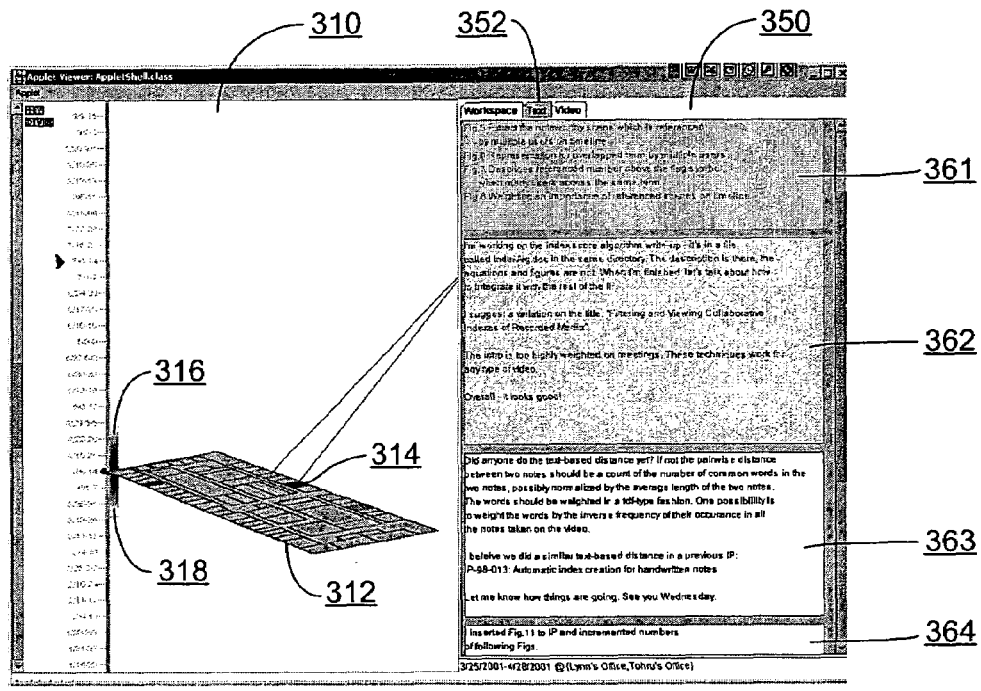
FIG. 3 is a diagram of a space time browser interface displaying text documents in accordance with one embodiment of the present invention.

A space time browser 300 in accordance with one embodiment of the present invention is shown in FIG. 3. Space time browser 300 includes content location window 310, document window 350, space plane 312, location indicator 314, time interval bars 316 and 318, document selection bar 352, and documents 361–364. In document window 350, the document selection bar 352 includes tabs for selecting a workspace, text, or video based documents. As shown in FIG. 3, the text tab is currently selected. Thus, text files corresponding to a selected space and time will be displayed in the document window 350. In the embodiment as shown in FIG. 3, the text of each text file may be shown in the document window. The borders of the text files displayed in document window 350 correspond to space indicator 314 and time interval bars 316 and 318 to represent the location of each text file in space and time.

Figure 4:
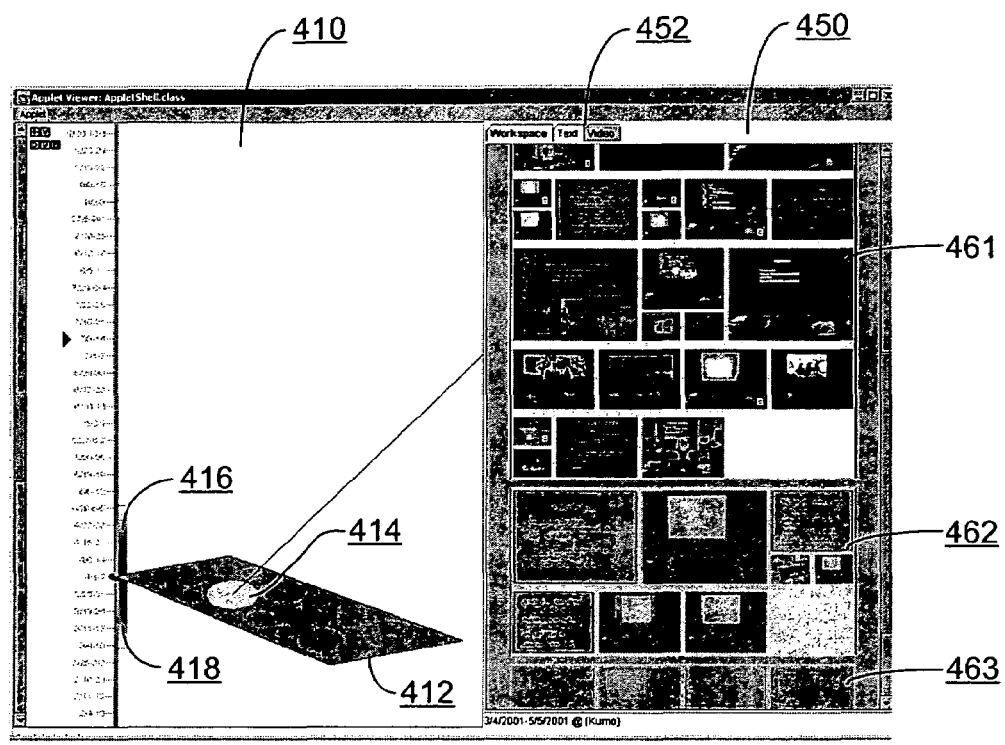
FIG. 4 is a diagram of a space time browser interface displaying video documents in accordance with one embodiment of the present invention.

A space time browser 400 in accordance with one embodiment of the present invention is shown in FIG. 4. Space time browser 400 includes content location window 410, document window 450, space plane 412, location indicator 414, time interval bars 416 and 418, document selection bar 452, and documents 461–463. Unlike the space planes in FIGS. 2 and 3, space plane 412 and location indicator 414 within space plane 412 represent an abstract location. In document window 450, the document selection bar 452 includes tabs for selecting a workspace, text, or video based documents. The video tab is currently selected. Thus, video files corresponding to the selected space and time are displayed in document window 450. Video files 461–463 are each represented by a series of key frames within each video. Videos may be represented in the present invention as key frames within a video sequence, a first or last frame, sequential frames, or in any other way video sequences are represented or summarized. When a video file is selected by the user from the document window, the space time browser may play the video using an external video playback application.

Figure 5:
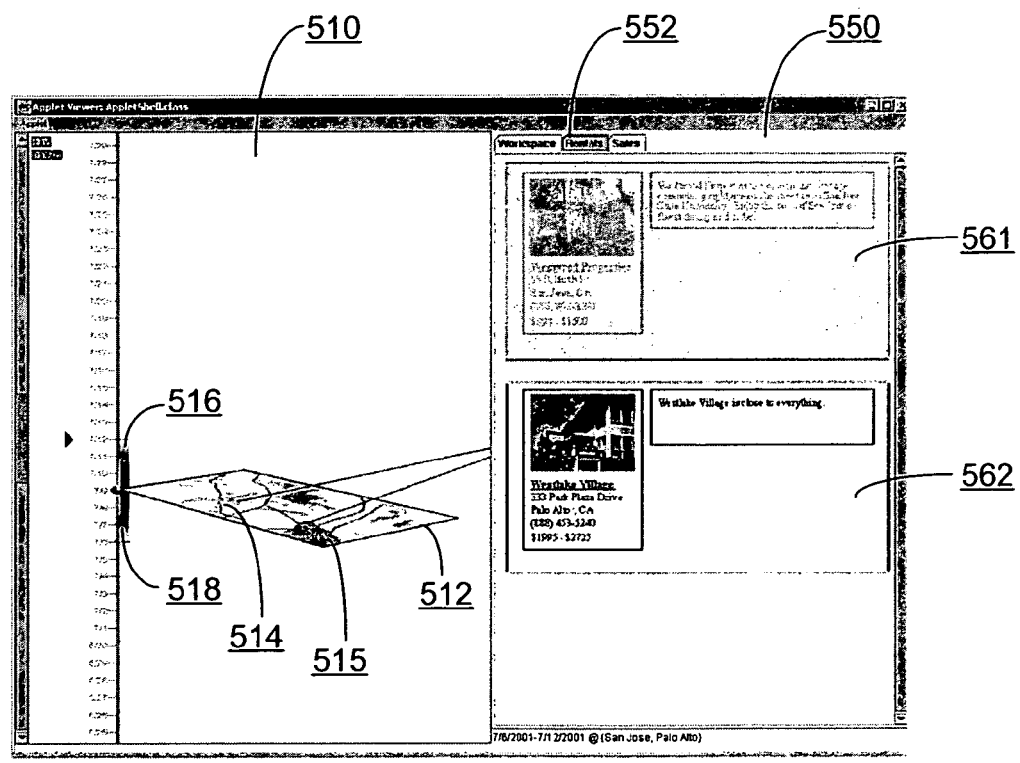
FIG. 5 is a diagram of a space time browser interface configured for real estate property management in accordance with one embodiment of the present invention.

A space time browser 500 in accordance with one embodiment of the present invention is shown in FIG. 5. Space time browser 500 includes content location window 510, document window 550, space plane 512, location indicators 514 and 515, time interval bars 516 and 518, document selection bar 552, and documents 561 and 562. Space time browser 500 is configured to be used for real estate management. Space plane 512 represents a map of a city or neighborhood. Location indicators 514 and 515 represent smaller portions of the neighborhood. In the embodiment shown in FIG. 5, the document selection bar has tabs corresponding to a workspace, rentals, and sales. The rental tab is selected in FIG. 5. Thus, when a location indicator is selected by a user, documents regarding real estate locations for rent located within the selected location and the time indicated by the time interval bars are displayed within the document window. The real estate rental may be designated a time corresponding to when it is available, when it was placed on the market, or some other time. Documents 561 and 562 each contain a picture of the rental property, an address and web link, and text descriptive of the rental property. When the sales tab is selected in document selection bar 512, a selected location indicator may generate documents corresponding to real estate locations for sale.

The present invention provides a system for browsing and accessing multiple types of electronic documents in real space and time. In one embodiment, a user may move a space indicator along a time line to perform inquiries. Each document in the browser has a time and space attribute. When the space indicator is located at a point in time that matches the space and time attributes document, the document is highlighted and a user may access the document. In one embodiment, a visual indicator representing a relevancy score is used to provide information regarding the proximity of a document to a selected space and time. The relevancy score may also be used to offset uncertainties inherent in location tracking systems. In one embodiment of the present invention, a document window is provided to display documents located at a selected point in space and time. Visual indicators associated with the documents in the document window may represent the time and space location of each document.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for browsing content in space and time comprising:
    providing a time indicator representing a first time period;
    providing a space indicator having a location indicator, the space indicator associated with a second time period, the second time period existing within the first time period; and
    providing a first content, the first content having a first time attribute and a first location attribute, the first content configured to be accessible when the first time attribute is within the second time period and the first location attribute is within the location indicator.

2. The method of claim 1 wherein the time indicator includes a time line.

3. The method of claim 1 further comprising providing a current time indicator, the current time indicator configured to indicate the current time within the first time period on the time indicator.

4. The method of claim 1 wherein the space indicator and the time indicator comprise a three dimensional grid configured to display content in space and time.

5. The method of claim 1 farther comprising providing a time interval bar, the time interval bar representing a third time period that extends from the second time period to an interval point either before or after the second time period, the first content configured to be accessible when the first time attribute is located within the second time period or the third time period and the first location attribute is within the location indicator.

6. The method of claim 5 wherein providing a time interval bar includes providing a first time interval bar having a first visual indicator and extending from the second time period backwards in time and having a second time interval bar having a second visual indicator and extending from the second time period forward in time.

7. The method of claim 6 wherein providing the first time interval bar baying the first visual indicator includes coloring the first interval bar a first color and providing the second time interval bar having the second visual indicator includes coloring the second interval bar a second color.

8. The method of claim 5 wherein providing the dine interval bar includes providing a third visual indicator associated with the time interval bar, the third visual indicator configured to develop as the time interval bar extends away from the second time period.

9. The method of claim 8 wherein providing the third visual indicator includes configuring the time interval bar to include fading, the fading increasing from the second time period to the interval point.

10. The method of claim 1 wherein providing the space indicator having a location indicator includes providing a visual indicator associated with the location indicator, the visual indicator having an on and off state, the on state associated with when the first content is accessible.

11. The method of claim 10 further including:
    providing a second content the second content having a second time attribute and a second location attribute; and
    changing the time period associated with the space indicator from a second time period to a third time period, the second content configured to be accessible when the second time attribute is within the first time period or the second time period and the second location attribute is within the location indicator, the on state associated with when the first content or second content is accessible.

12. The method of claim 11 wherein providing the visual indicator includes coloring of the location indicator.

13. The method for browsing content in space and time comprising:
    providing a time indicator representing a first time period;
    providing a space indicator representing a space plane, the space plane having a location indicator, the space indicator associated with a second time period, the second time period existing within the first time period;
    providing a first content, the first content having a first time attribute and a first location attribute, the first content configured to be accessible when the first time attribute is within the second time period and the first location attribute is within the location indicator;
    providing a time interval bar, the time interval bar representing a third time period that extends from the second time period to an interval point either before or after the second time period, the first content configured to be accessible when the first time attribute is located within the second time period or the third time period and the first location attribute is within the location indicator, the time interval bar having a time bar visual indicator that includes coloring;
    selecting the first content by a user while the first content is accessible; and
    displaying the selected first content in a document window.

14. The method of claim 13 wherein displaying the selected first content includes:
    providing a selection indicator indicating that content located in the first space is displayed in the document window; and
    displaying a document in a document window, wherein the first content includes the document.

15. The method of claim 14 wherein displaying the document includes:
    providing a first visual indicator relating to the time location of the document; and
    providing a second visual indicator relating to the space location of the document.

16. The method of claim 15 wherein providing the first visual indicator includes coloring a first portion of the document corresponding to the coloring of the time bar visual indicator and providing the second visual indicator includes coloring a second portion of the document according to the color of the location indicator the document is located in.

17. The method of claim 14 wherein providing the time interval bar includes providing a fading associated with the time interval bar, the degree of fading configured to increase as the time interval bar extends away from the second time period, and wherein displaying a document includes providing a fading in the display of the document, the degree of document fading corresponding to the degree of fading at the point in time in the time interval bar the document exists.

18. The method of claim 14 wherein the document is one of a text file, digital picture file, video file, spreadsheet file, and word processing file.

19. The method of claim 18 further comprising:
   selecting a document from the document window; and
   executing an application for accessing the document.

20. A method for browsing electronic documents comprising:
   providing a three dimensional representation of space and time, the three dimensional representation having a time line and a two dimensional space plane, the space plane associated with a first time within the time line;
   providing a location indicator on the space plane, the location indicator representing a location and including a visual indicator having an on and off state;
   providing a document having a time attribute and space attribute, wherein the document is accessible when the time attribute is within the first time and the location attribute is within the location indicator,
   providing a document window, the document window configured to display an accessible document located in a location indicator; and
   displaying a representation of an accessible document in the document window, the representation of the document including:
      a first visual indicator providing location information of the accessible document; and
      a second visual indicator providing time location of the accessible document.

* * * * *